No. 11,689. Reissued Aug. 30, 1898.

J. H. BOWLEY.

ELECTRIC CIRCUIT CONTROLLER.

(Application filed Mar. 19, 1898.)

2 Sheets—Sheet I.

Witnesses

M. A. Sheldon

R. G. Henderson

Inventor

Joseph Henry Bowley

THE NORRIS PETERS CO., PHOTO-LITHO., WASHINGTON, D. C.

No. 11,689. Reissued Aug. 30, 1898.

J. H. BOWLEY.

ELECTRIC CIRCUIT CONTROLLER.

(Application filed Mar. 19, 1898.)

2 Sheets—Sheet 2.

Witnesses

M. A. Sheldon

R. E. Hudson

Inventor

Joseph Henry Bowley

THE NORRIS PETERS CO., PHOTO-LITHO., WASHINGTON, D. C.

UNITED STATES PATENT OFFICE.

JOSEPH HENRY BOWLEY, OF WASHINGTON, DISTRICT OF COLUMBIA, ASSIGNOR OF ONE-HALF TO JOHN W. STOCKWELL, OF MARENGO, ILLINOIS.

ELECTRIC-CIRCUIT CONTROLLER.

SPECIFICATION forming part of Reissued Letters Patent No. 11,689, dated August 30, 1898.

Original No. 593,510, dated November 9, 1897. Application for reissue filed March 19, 1898. Serial No. 674,545.

*To all whom it may concern:*

Be it known that I, JOSEPH HENRY BOWLEY, a citizen of the United States, residing at Washington, in the District of Columbia, have invented certain new and useful Improvements in Electric-Circuit Controllers; and I do hereby declare the following to be a full, clear, and exact description of the invention, such as will enable others skilled in the art to which it appertains to make and use the same.

As will be hereinafter described and claimed, and illustrated in the accompanying drawings, my invention appertains to the control of atmospheric conditions in food-storing chambers, and more particularly to means for controlling and operating the valves and other appliances employed to effect such control.

Figure 1:
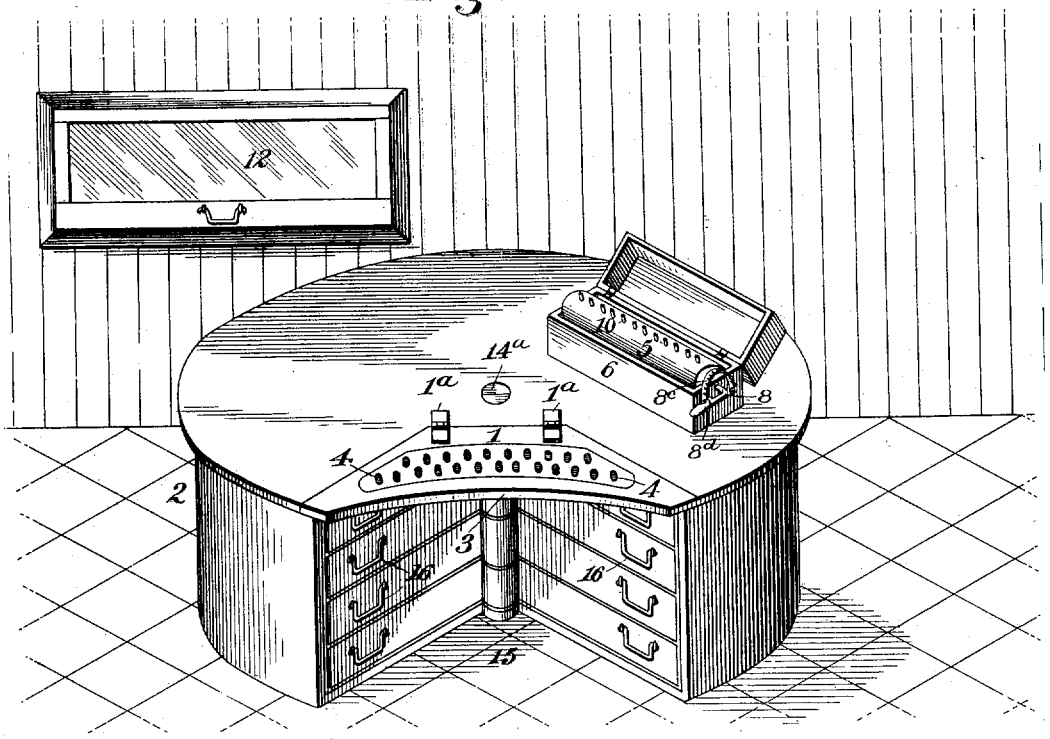
Figure 2:
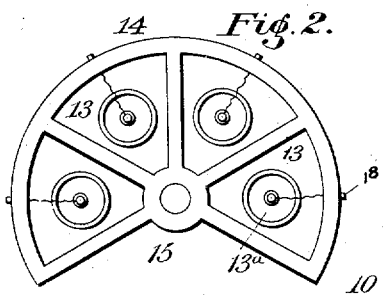
Figure 3:
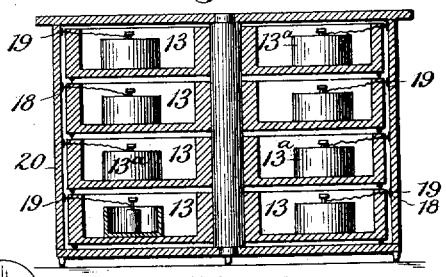
Figure 4:
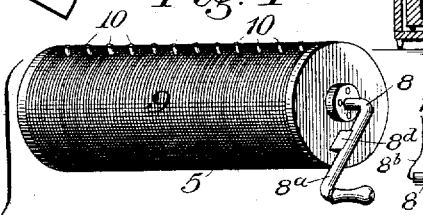
Figure 5:
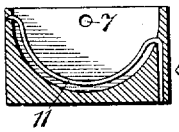
Figure 6:
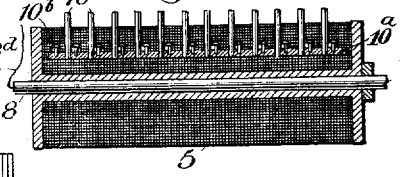
Figure 6:
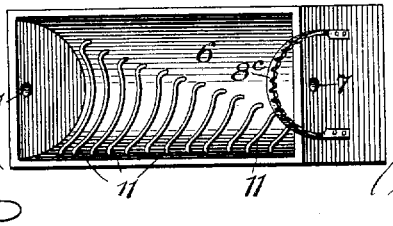
Figure 7:
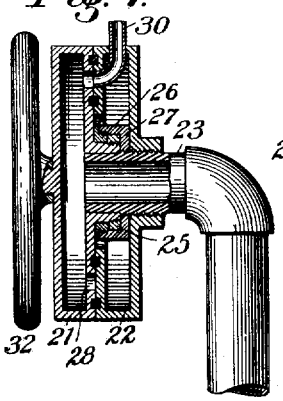
Figure 8:
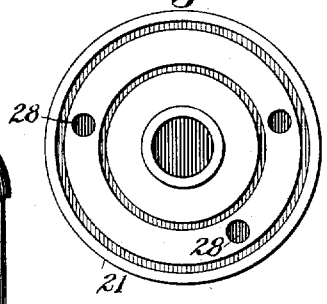
Figure 9:
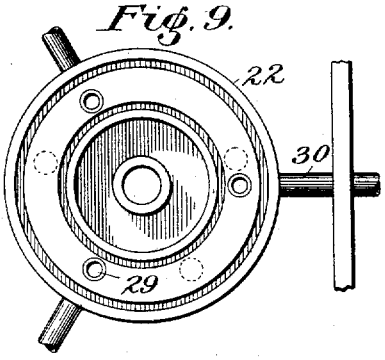
Figure 10:
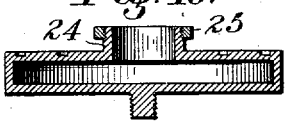
Figure 11:
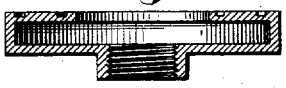
Figure 12:
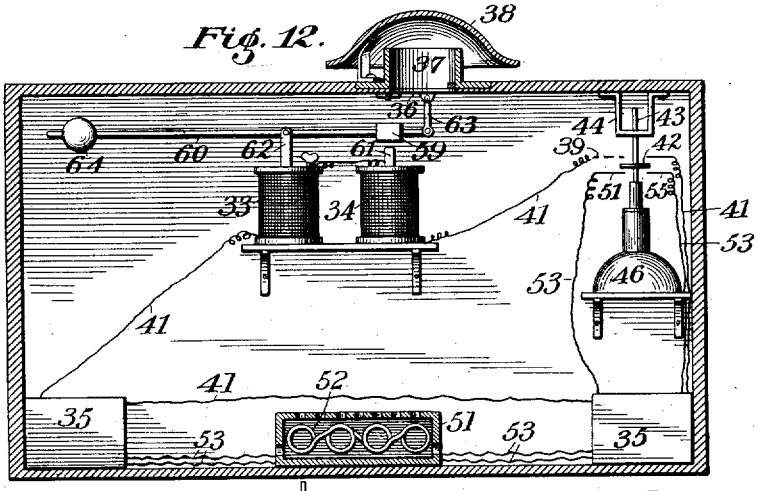
Figure 13:
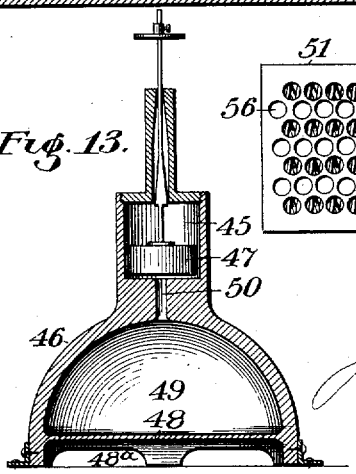
Figure 14:
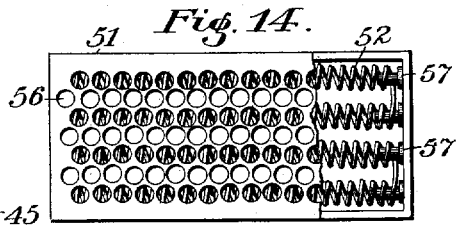

In the accompanying drawings, Figure 1 is a perspective view showing my improved switchboard-battery. Fig. 2 is a part of the battery-cabinet removed. Fig. 3 is a transverse central section of Fig. 1 on a slightly-reduced scale. Fig. 4 is a detail of my improved commutator-cylinder and seat therefor. Fig. 5 is a transverse section of the commutator-seat on line *a a* of Fig. 4. Fig. 6 is a longitudinal section of the commutator-cylinder. Fig. 7 is a vertical section of my improved valve on a line with one of the exit-ports. Fig. 8 is a plan view of the face of the outer member of my valve. Fig. 9 is a plan view of the face of the inner member thereof. Fig. 10 is a central section of Fig. 8. Fig. 11 is a central section of Fig. 9. Fig. 12 is a diagrammatical view in illustration of my method adapted for controlling atmospheric conditions of a storage-chamber. Fig. 13 is a vertical section of my automatic circuit opener and closer. Fig. 14 is a top plan view of my heating-coil, showing the upper casing therefor partly broken away.

In carrying out my invention I find it necessary to arrange in coöperative relation with respect to each other a number of elements, which I will now proceed to individually describe.

It may be stated that my invention comprehends the provision of a valve of special construction, the location thereof in or near the storage-chamber, an automatic control for such valve, and means for determining the atmospheric condition of the storage-chamber without the necessity of a personal visit thereto, and also to such other coöperative elements as will be necessary to place those referred to in coöperative combination.

My improved switchboard consists of the switchboard proper, 1, which is mounted upon the table 2, preferably constructed as shown and having a cylindrical body, one side thereof having a concave edge 3, contiguous to which the operator is placed. The switchboard proper, 1, consists of a thin plate of suitable material, having a series of buttons or levers 4, by means of which electrical circuits are closed and opened, thereby operating local magnets located near by or in remote sections of the building or in various parts of the city, each lever or button having control of its respective work, which work may be clearly designated by suitable labels.

Upon one end of the switchboard or other preferred location I mount the commutator-cylinder 5, which is mounted in the concave seat 6, provided in the face of the switchboard at any preferred point and adapted to receive the lower third or half of said cylinder. The opposite ends of said seat may be provided with suitable bearings 7, adapted to receive the journals 8 on the cylinder and permit the free rotation thereof. The commutator-cylinder consists, essentially, of coils of insulated wire 9 which are practically the well-known resistance-coils used in electrical devices. Upon the peripheral face of the commutator-cylinder are a series of contact-points 10, which are designed to make contact with suitable parts to establish different currents, which will be transmitted through suitable conductors to any point desired. Said contact-points are preferably connected to a metal plate $10^a$, having retaining-screws $10^b$. In forming the cylinder I fill it one-half or two-thirds full, more or less, when I set the plate $10^a$ in position and complete the winding process, after first removing a section of the insulation of the wire at a point thereon opposite the retaining-screws $10^b$ when said screw is turned home against the bared section, thus providing for the electrification of said plates and points thereon. Upon the face of the concave seat 6 are arranged the series of spring contact-plates 11, each one of which will connect by a suitable conductor with a separate battery of the cabinet and so disposed transversely in the bottom of said seat that the first will extend entirely across, the second being shorter than the first, the third slightly shorter than the second, and so on. It will be seen that the contact-points 10 upon the cylinder are arranged in a straight line in such a manner that each point will coincide or come in contact with its respective plate only. As many of the points and the respective plates as desired may be brought into registration by simply turning the cylinder. Each of the contact-plates 11 preferably represents but one of the cells of the battery, with which it is suitably connected, and it will be understood that when the force of but one cell is required the commutator-cylinder will be rotated in such a manner that but one of its contact-points will be in contact with its plate. When it is desired to increase the power, the cylinder is rotated so as to bring the second contact-point into contact with its individual plate, and so on until all of the pairs of said points and plates may be brought into connection with each other, and thereby multiply the force in proportion to the number of cells in the battery.

It will of course be understood that the journal 8 opposite the operating handle or lever $8^a$ has electrical connection with the insulated wires upon the cylinder and that a suitable wire $8^b$ is so mounted that its end will be in contact with said journal, and thus provide means for conveying the current to any desired point, for instance, by connecting said wire with the conductor leading from the particular push-button of the switch controlling the member, which may require a stronger or weaker current under different conditions. A ratchet-bar $8^c$ is placed upon the concave seat at the end adjacent to the operating-handle in order that the point $8^d$ on said handle may engage with one of the ratchets, and thus hold the cylinder in an adjusted position. This ratchet-bar serves to indicate the extent of rotation of the cylinder. There being as many notches in the bar as there are pins in the cylinder and plates in the concave seat 6, it is obvious that by observing the particular notch with which the point $8^d$ may for the time be engaged it will indicate that the corresponding number of pins and plates are in contact, and hence will be known the number of battery-cells brought into action, and consequently the electrical force or power for the time employed, and which can be increased or decreased by shifting the position of the cylinder so as to bring more or less of the pins and plates into contact.

It will be understood that in providing power for the actuation of some simple mechanical device—such, for instance, as one of my improved valves or the mechanism for opening or closing a door or window—the electrical energy comprised in one of the cells will be all that is required, in which case the operator will so manipulate the commutator-cylinder that the desired amount of force will be applied. When it is desired to bring to bear all the electrical force comprised in all of the cells—when, for instance, it is desired to operate with its heavy load one of the elevators in the warehouse—the operator will be able by a proper rotation of said cylinder to bring the whole force of all the cells into use.

It will be understood that each of the segmental sections 13 will contain a cell of the battery and that the number of sections may be multiplied as desired and also that in operation one of said cells or all of them may be simultaneously applied, as the necessities of the case may demand.

In order to render the segmental sections 13 readily accessible, one or more of said sections are omitted, which omission provides immediately under the switchboard an opening 15, adapted to accommodate the operator.

It will be seen that a series of segmental sections are connected together, forming the disks or compartments 14. When it is desired to have access to any of the cells in any one of the segmental sections, the disk or compartment may be rotated until such cell comes into view under the switchboard 1, which is attached to the body by hinges $1^a$, and may be raised and lowered at will. Suitable handles 16 may be provided for each of the disks 14. Each of the cells $13^a$ of the battery is complete in itself—that is to say, each one is provided with its complement of zinc and carbon poles and a proper quantity of biting liquid—and each has its individual wire and brush 18. Each brush is designed to contact with its individual plate 19, located upon the inner face of the housing or casing 20, attached rigidly to the top of the table and adapted to protect the series of disks 14. Each of the contact-plates 19 is connected with one of the spring-plates 11, located in the concave seat 6, and by this arrangement it will be seen that the several cells of the battery are entirely separated from each other, enabling the operator through the medium of the commutator-cylinder to bring the force of but one cell or the entire battery to bear upon any given work.

In order to make it fully apparent how I propose to absolutely control and regulate the temperature of different compartments, I will state that where it is desired to establish and maintain, for instance, a certain degree of humidity in the atmosphere I will locate a hygrometer either within the compartment to be controlled or in the air-tight box 12, immediately within the vision of the operator near the switchboard. Said box shall be connected by suitable pipes with the compartment containing the food supplies, and thus contain a sample of the atmosphere therein. If the hygrometer is located directly in the compartment containing the subject-matter to be treated, the operator will be required to take occasional observations thereof, and if its indices designate that too much moisture is in suspension he will manually or electrically by means of the switchboard actuate one of the valves located in said compartment, and thus introduce a new supply of drier atmosphere and at the same time permit the exit of part of the moisture-laden air. If, however, the hygrometer is located in the box 12, the operator can without removing from his place at the switchboard note the condition of the atmosphere in the compartment, which may be far distant, and by setting up an electrical connection with the valve located in the compartment open or close it through the mediation of the proper button before him, accomplishing the same result as though he was personally present. The temperature of the atmosphere may be observed and regulated in the same manner. A thermometer of any approved pattern may be located either within the housing 12 or within the compartment containing the goods to be preserved, and the work of raising or lowering the temperature may be done by visiting the compartment or through the automatic control of the switchboard without necessitating such visit.

The box or receptacle 12 is made air-tight and is provided with a glass front, and the box when thus formed is connected in any suitable manner with pipes leading to and from the storage-chamber, thus providing that a sample of the atmosphere in said chamber will be forced in said box. Said receptacle or box 12 is provided with a suitable handle 12[a], by means of which the door may be opened when it is desired to gain access to the interior. Within said receptacle I locate any preferred style of barometer, hygrometer, thermometer, &c., which may at all times be readily seen through the glass front and the condition of the atmosphere thereby ascertained. I thus prefer to locate the box at a convenient point to the operator of the switchboard, enabling him to read the condition of the storage-chamber, though it be far removed. It will be understood that by means of the electrical control provided for the valves in said storage-chamber the operator will be enabled to easily regulate the atmospheric condition thereof. When, for instance, the thermometer indicates too high a temperature, one of the buttons having electrical control of the proper valve is pressed, when such valve is opened, admitting cooler air. In like manner, if the temperature is indicated as being too low, the proper valve is opened, which will admit heated air. It will be understood that the pipes leading from the storage-chamber to the box 12 shall be suitably covered with non-conducting material, as asbestos or the like.

In order to provide one valve which will perform the office of several individual valves, I have provided what I term my improved "polyway" valve, as fully illustrated in Figs. 7 to 11, inclusive. My valve consists of the members 21 and 22, designed to closely engage each other, the member 22 being secured in position upon the end of the supply-pipe 23. It will be observed that the member 21 is provided with an inwardly-extending hub 24, upon which is seated in screw-threads the annular collar or rim 25. Before said collar is turned home in its operative position I place upon said hub the loosely-fitting sleeve 26, which has a threaded connection with the retaining-flange 27, having threaded connection with the pipe 23. The member 21 is provided upon its internal face with a series of ports 28, which may be multiplied in number, as preferred, though I have shown but three. Upon the inner face of the member 22 I provide a series of exit-ports 29, having exit-pipes 30 seated therein. The location of these ports is such that but one pair thereof will register with each other when the valve is in an opened position. Upon the outer face of the member 21 I form the threaded hub 31, designed to receive the operating handle or wheel 32, by means of which the member 21 may be rotated in either direction.

In assembling the several parts of my improved valve I first place upon the hub 24 the loosely-fitting sleeve 26, when the threaded collar 25 is turned home. I then place upon the threaded end of the pipe 23 the member 22, followed by the retaining-flange 27, the outer threaded ends of which are designed to engage the sleeve 26. After these parts have been thus placed in position the member 22 is placed in position, the free smooth end of pipe 23 entering the bore of the hub 24, when a proper rotation of the member 21 will cause the sleeve 26 and the flange 27 to firmly engage with each other, and thus bind all the parts securely in position. It will be apparent that by rotating the member 21 upon its axle, formed by the smooth end of the pipe 23, any of the ports therein may be brought into registration with a desired port upon the member 22, and thus convey the fluid supplied by the pipe 23 to any desired point. It will also be apparent that the direction of the fluid may be reversed when it is desired to use the pipe 23 as a common conveyer for several varieties of atmosphere, supplied in this case by the several pipes 30—that is to say, one of the pipes 30 may communicate with the chamber containing very cold air, while the third or fourth, as the case may be, may supply atmosphere especially charged with an antiseptic gas, &c., enabling the pipe 23 to carry all of these varieties to the storage-chamber at the will of the operator. In order to electrically rotate the member 21, the hand-wheel 32 may be replaced by a suitable gear designed to mesh with a gear of proper size upon a motor located contiguous thereto. As any proper variety of motor may be employed, it is not deemed necessary to refer to the details of construction thereof.

In Fig. 12 I have illustrated a preferred form of arrangement for the automatic control of the temperature in a storage room or car, whereby a valve is automatically or electrically controlled in such a manner that a valve is opened when the temperature is too high and closed when too low.

Referring in detail to Fig. 12, 33 and 34 represent local magnets, while 35 represents a battery-receptacle. It will be understood that these parts may be located at any preferred point in the storage room or car, the magnet being located near by the valve which it is designated to operate. 36 indicates a valve formed in the ceiling of the room or the roof of the car, and consists, in addition to the valve proper, 36, of the protecting-flange 37 and a shield 38, the latter designed to prevent cinders or the like from entering the compartment when the valve is opened. 39 and 40 represent the ends of the wires 41, which form a complete circuit, connecting the magnets 33 and 34 and batteries 35, while 42 represents a circuit opener and closer connected rigidly to a vertically-movable rod 43, properly supported in a vertical position by bracket 44, its lower end being seated in the chamber 45, provided in the receptacle 46. It will also be observed that the rod or plunger 43 has attached to its lower end the head or disk 47, formed of a light porous material, as cork or the like. The receptacle 46, it will be observed, is of peculiar construction, having the hemispherical base forming the cavity 49 designed to contain a sensitively expanding and contracting liquid of suitable character, though I prefer to employ mercury for this purpose. By the construction just described for the mercury-receptacle substantially two compartments are provided in the neck, the lower being designed to hold the float, while the upper one supports and guides the rod or plunger 43. The chamber 45 communicates by means of a small aperture with the chamber or cavity 49, which arrangement tends to more reliably secure the float against lateral movement than would be the case if it rested on a more expansive surface of mercury or other liquid employed. The chambers 45 and 49 communicate with each other by a small aperture 50, which will permit the mercury or other liquid to rise into the chamber 45, and thus raise the head 47 and the plunger attached thereto when such liquid expands by action of heat. 51 represents a suitable receptacle designed to house the heating-coils 52, which are also suitably connected, as by wires 53, with the batteries 35 and also with the terminals 54 and 55. Said terminals 54 and 55 are also designed to be acted upon by the circuit opener and closer, when, through contraction, the liquid in the receptacle 46 causes the head 47 to become lowered, permitting said opener and closer 42 to engage with the terminals 54 and 55. The receptacle 51 is provided with a series of perforations 56, which may also be formed in the sides of the receptacle, if deemed necessary, in order to permit the free exit of heated air. The heating-coils 52 are held in a suspended position within the receptacle 51 by the supports 57, formed of glass or other suitable non-conducting material, properly secured to the sides of the receptacle.

The operation of my improved controlling device of the atmospheric conditions of a storage-room or other compartment where its use is deemed advisable may be stated to be as follows: It will be understood that the valve or door 36 is normally closed, and when the temperature becomes colder than is desired the circuit-closer 42 will be lowered by means of the contraction of the liquid in the receptacle 46 into engagement with the terminals 54 and 55, thus setting up an electrical connection through the wires 53 with the battery and the heating-coils, enabling such coils to perform their office in the usual manner. When the temperature of the compartment becomes too high, the liquid in the receptacle 46 will expand sufficiently to elevate the head 47 and incidentally cause the circuit-closer 42 to contact with the ends of the wires or terminals 39 and 40, which coöperation results in causing the contact-block 59 upon the pivoted lever to become lowered by attraction into engagement with the terminal 61 upon the coil or magnet 34. The lever 60, it will be seen, is pivoted to the terminal 62 upon the coil 33, while one end thereof is pivotally connected to the valve or door 36 by means of the arm 63, while the other end thereof is provided with the counterpoise 64, suitably mounted thereon by screw-threads or any preferred manner.

It will be understood that the arrangement I have provided for the automatic control of the temperature of a compartment is equally efficient and desirable when used in connection with residences and office-rooms, though its principal value lies in providing a means for producing a uniform temperature in storage rooms and warehouses where it is desired to care for large quantities of stored food—such as eggs, meats, and fruits.

My improved switchboard (illustrated in Fig. 1) will be found specially desirable in the control of valves when the automatic device above described is not employed, though it might be used in combination therewith if a suitable indicator is placed in the box 12 to designate the atmospheric condition of the storage-chamber, thus guarding against the failure through any cause of the automatic means set forth.

It will be seen that I have produced a labor-saving device by means of which the control of the atmospheric condition of the rooms of a storage-warehouse is placed under the control of the switchboard and one operator therefor. It is thought that my improved commutator-cylinder will be found desirable in any case requiring a perfect control or regulation of the force of the opening cells of the motor.

In order to render the receptacle for the mercury readily susceptible to atmospheric changes, I prefer to construct the bottom thereof of sheet metal, while the lower edge of the base is cut away to provide the openings 48[a].

Having thus fully described my invention, what I claim as new, and desire to secure by Letters Patent, is—

1. An automatic regulator for electric circuits, consisting of a receptacle having a base and neck portion, said neck having an upper and lower compartment, a float mounted in the lower compartment of the neck, a standard erected upon said float and in said neck and having fingers designed to engage the ends of the wires forming the circuit, substantially as specified and for the purpose set forth.

2. The herein-described electric-circuit opener and closer, consisting of the mercury-receptacle having a base and neck portion, said neck portion being divided into two communicating chambers, the lower one being slightly larger, a float mounted in said lower chamber of the neck, a rod erected upon said float and extending upward through the upper neck-chamber, said rod carrying cross bars or fingers designed to connect the adjacent ends of the wires forming the circuit as said rod is raised or lowered by the action of said float, all operatively combined in the manner and for the purpose set forth.

3. A switching device for electrical energy consisting of a cylindrical coil of insulated wire, a series of contact-points in electrical contact with said wire, a supporting-axle for rotatably mounting said cylindrical coil and having electrical connection therewith, and a support or seat designed to receive part of said cylinder, said seat being provided with a series of transversely-disposed contact-plates for coöperating with the points on said cylinder, each of said plates being connected with the source of electrical energy, substantially as described and for the purpose set forth.

4. The herein-described switchboard, consisting of an outer casing, a series of rotatable disk-sections mounted therein, each of said disks having a series of segmental compartments, and an open section, electric batteries mounted in said compartments, an individual contact point or brush for each battery, attached to the periphery of said disk, a contact-plate for coöperating with said brush, located upon the inner face of the outer casing, and a series of contact-plates located in a concave seat upon the table, each having wire connection with the plates on the casing, as and for the purpose set forth.

5. As an improvement in differentiating mechanism for electric energy, the combination with a series of batteries having an individual plate for each cell thereof, each plate being transversely disposed in a concave seat, of a cylinder formed of insulated wire and provided with a series of spirally-disposed contact-points upon its surface designed to successively engage said plates, a supporting-axle in electrical union with said wire and points, designed to rotatably hold said cylinder in said seat, and means for rotating and locking said cylinder in an adjusted position, as set forth.

6. As an improvement in electrical switches, the combination with a series of batteries and graduated plates having electrical union, of a rotatably-mounted cylinder formed of insulated wire having contact-points spirally disposed on the surface thereof, a supporting-axle, having suitable bearings, in electrical union with said contact-points and with the transmitting-wire and a concave seat designed to receive said plates and cylinder and permit the contact-points thereon to successively engage the plates, substantially as described and for the purpose set forth.

7. The herein-described valve designed to permit liquid to pass through it in either direction, consisting of two contiguous drums, said drums having perforations in their contacting faces, one of said drums being stationary and having a plurality of pipe connections, while the other drum is rotatably mounted and provided with a single pipe connection, all of said parts being arranged in the manner and for the purpose set forth.

8. A switching device for electrical energy consisting of a cylinder having insulated coils of wire, a series of contact-points held in position by said wires and in electrical connection therewith, a leading-out wire electrically connected with said coils of wire, and contact-plates each connected with a separate source of electrical supply, said contact-points and contact-plates being so arranged one in relation to the other that in the movement of one the members of the two will be successively brought into or out of contact one with the other to vary the electrical energy, substantially as described and for the purpose set forth.

9. The valve designed to permit an agent to pass through it in either direction, consisting of two contiguous drums having ports in their meeting faces, one of said drums being stationary while the other drum is rotatable, one of said drums having an inlet for the agent and the other pipes from its ports, substantially as described and for the purpose set forth.

10. An automatic regulator for electric circuits consisting of a chamber having a valve-controlled opening, an electric circuit, an electromagnet in said circuit and whose armature is adapted to actuate said valve, a movable contact-point adapted on the increase of the temperature to complete said circuit and energize the magnet to open the valve, a second circuit of which said contact-point constitutes a part, and an electric heating device in said second circuit, said movable contact-point operating upon the fall of the temperature below a given temperature to close said second circuit to energize said heating device to raise the temperature, substantially as and for the purposes described.

11. The electric-circuit opener and closer consisting of the circuit-wires, a movable contact-point adapted to establish a circuit through one set of coils in coming in contact with its terminals and to break said circuit and in coming in contact with the terminals of another set of circuit-wires to establish another circuit, and a chamber for containing a sensitively expanding and contracting agent influenced by changes in temperature for actuating said contact-point on a change in temperature to close one or the other of said circuits according as the temperature is to be raised or lowered, substantially as described and for the purpose set forth.

12. An electrical-circuit opener and controller comprising circuit-wires, a movable contact-point adapted to establish a circuit through one set of circuit-wires in coming in contact with its terminals and to break said circuit and in coming in contact with the terminals of another set of wires to establish another circuit, cooling and ventilating means in one of said circuits, heating means in the other circuit, and a chamber for containing a sensitively expanding and contracting agent influenced by changes in temperature for actuating said contact-point on a change in temperature to close one or the other of said circuits according as the temperature is to be raised or lowered, substantially as and for the purposes described.

13. The combination of a number of revolving sections arranged one above the other, electrical-energy devices in said sections, and means for establishing electrical connection between said devices and electrical conductors, substantially as described and for the purpose set forth.

14. The combination of a revolving section, an electrical-energy device carried by said section, means for establishing electrical connection between said device and an electrical conductor, a casing or housing for said section having an open portion for viewing the electrical-energy device when brought to said open portion, and a movable switchboard over said open portion, substantially as described and for the purpose set forth.

In testimony whereof I affix my signature in the presence of two witnesses.

JOSEPH HENRY BOWLEY.

Witnesses:

W. A. SHELDON,

W. G. HENDERSON.